US006685193B2

(12) United States Patent
Roberts et al.

(10) Patent No.: US 6,685,193 B2
(45) Date of Patent: Feb. 3, 2004

(54) SELF LUBRICATING, NON-SEALING PISTON RING FOR AN INTERNAL COMBUSTION FASTENER DRIVING TOOL

(75) Inventors: William Roberts, Grayslake, IL (US); Chris H. Porth, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/945,443

(22) Filed: Aug. 30, 2001

(65) Prior Publication Data

US 2003/0042686 A1 Mar. 6, 2003

(51) Int. Cl.[7] .................................................. F16J 9/12
(52) U.S. Cl. ...................... 277/459; 277/464; 277/465; 277/466
(58) Field of Search ................................ 277/459, 436, 277/447, 448, 460, 464, 465, 461, 462, 463

(56) References Cited

U.S. PATENT DOCUMENTS

| | | | | | |
|---|---|---|---|---|---|
| 307,334 | A | * | 10/1884 | Richards | |
| 1,406,763 | A | * | 2/1922 | Schoen | |
| 1,457,461 | A | * | 6/1923 | Renshaw | 277/465 |
| 1,710,485 | A | * | 4/1929 | McKone | 277/451 |
| 1,769,974 | A | * | 7/1930 | Szekely | 277/464 |
| 1,806,143 | A | * | 5/1931 | Blomgren | 277/464 |
| 1,877,414 | A | * | 9/1932 | Marshall | 277/464 |
| 2,258,169 | A | * | 10/1941 | Amberg | 277/464 |
| 2,345,589 | A | * | 4/1944 | Engelhardt | |
| 2,428,031 | A | * | 9/1947 | Mayes | |
| 3,656,414 | A | | 4/1972 | Muller | |
| 3,735,992 | A | * | 5/1973 | Prostorov et al. | 277/464 |
| 3,744,805 | A | * | 7/1973 | Heinrich | 277/400 |
| 3,784,215 | A | * | 1/1974 | Ruthenberg | 251/306 |
| 3,971,298 | A | | 7/1976 | Kulig | |
| 4,094,519 | A | * | 6/1978 | Heyn et al. | 277/559 |
| 4,102,608 | A | * | 7/1978 | Balkau et al. | 277/436 |
| 4,124,220 | A | * | 11/1978 | Leone et al. | 123/188.6 |
| 4,516,481 | A | * | 5/1985 | Geffroy et al. | 92/212 |
| 4,526,388 | A | | 7/1985 | Marshall | |
| 4,576,381 | A | | 3/1986 | Slack | |
| 4,610,319 | A | * | 9/1986 | Kalsi | 175/371 |
| 4,629,200 | A | * | 12/1986 | Ruddy | 123/193.6 |
| 4,813,342 | A | | 3/1989 | Schneider et al. | |
| 5,117,742 | A | * | 6/1992 | Iida | 277/445 |
| 5,172,921 | A | * | 12/1992 | Stenlund | 277/300 |
| 5,193,821 | A | * | 3/1993 | Rehfeld | 277/468 |
| 5,312,117 | A | * | 5/1994 | Takenaka et al. | 277/400 |
| 5,378,123 | A | * | 1/1995 | Scuderi et al. | 417/415 |
| 5,409,240 | A | | 4/1995 | Ballard | |
| 5,524,904 | A | * | 6/1996 | Willi et al. | 277/552 |

(List continued on next page.)

FOREIGN PATENT DOCUMENTS

| | | | | | |
|---|---|---|---|---|---|
| DE | 1918690 A | * | 10/1970 | F16J/9/00 |
| DE | 3520668 A1 | * | 6/1986 | F02F/5/00 |

*Primary Examiner*—William Miller
*Assistant Examiner*—Thomas Ho
(74) *Attorney, Agent, or Firm*—Lisa M. Soltis; Mark W. Croll; Donald J. Breh

(57) ABSTRACT

A non-sealing, lubricating piston ring for lubricating the cylinder wall of a piston housing in a combustion tool is disclosed. The lubricating piston ring is made from a lubricating material such as polytetrofluroethylene (PTFE). The shape of the PTFE ring is designed to optimize the lubricity of the piston housing, while allowing enough friction for the piston to operate properly within the piston housing during reciprocating cycling movement. The PTFE ring may have radial fins extending from an outer surface thereof that are angled to promote ring rotations, such that the ring moves easily along and efficiently lubricates the inner cylinder wall of the piston housing. The PTFE ring does not form a seal between the piston and the housing. Instead, the PTFE ring is positioned above or below a sealing ring, such as a steel piston ring which forms the seal between the piston and the piston housing.

3 Claims, 3 Drawing Sheets

U.S. PATENT DOCUMENTS

| | | | | | |
|---|---|---|---|---|---|
| 5,676,380 | A | * | 10/1997 | Sell | 277/465 |
| 5,695,199 | A | * | 12/1997 | Rao et al. | 277/455 |
| 5,711,205 | A | | 1/1998 | Wolfer et al. | |
| 6,113,107 | A | | 9/2000 | Wang et al. | |
| 6,142,393 | A | * | 11/2000 | Kotyk | 239/288 |
| 6,158,643 | A | | 12/2000 | Phillips | |
| 6,193,236 | B1 | * | 2/2001 | Helpap | 277/435 |
| 6,494,462 | B2 | * | 12/2002 | Dietle | 277/549 |

* cited by examiner

FIG. 1
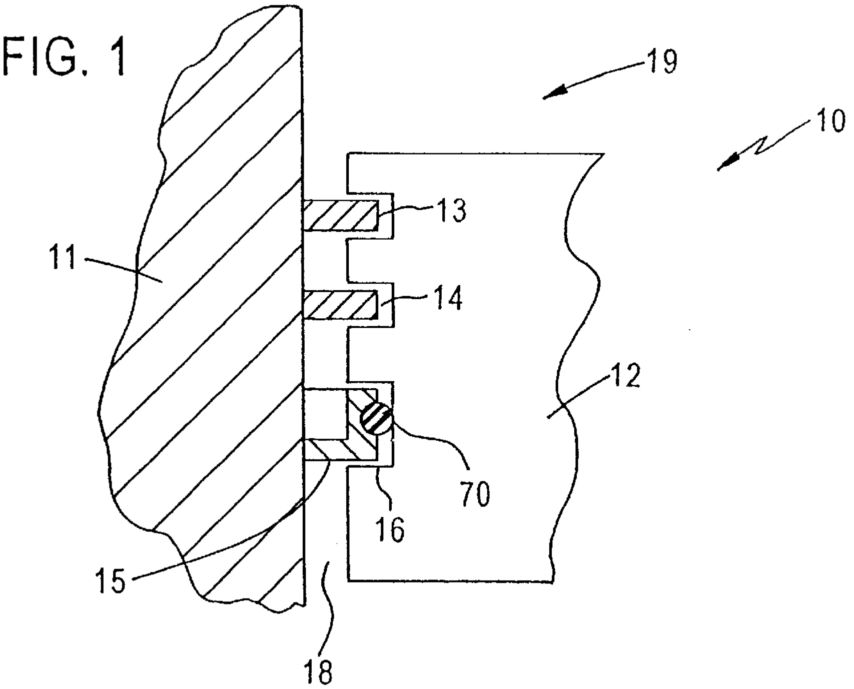
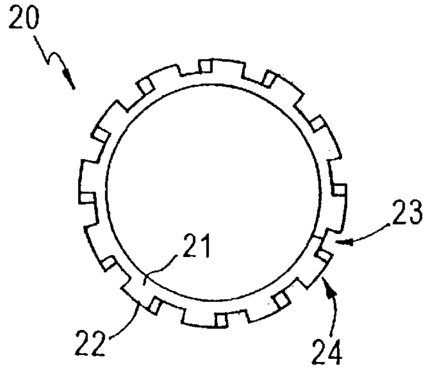
FIG. 2
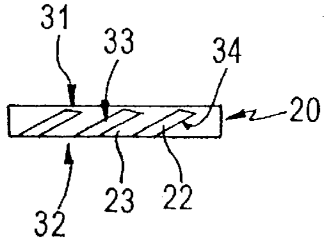
FIG. 3
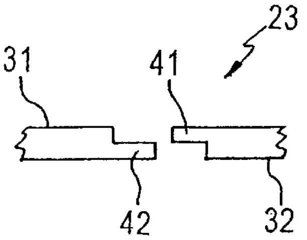
FIG. 4

SELF LUBRICATING, NON-SEALING PISTON RING FOR AN INTERNAL COMBUSTION FASTENER DRIVING TOOL

TECHNICAL FIELD

The present invention generally relates to piston rings for lubricating a cylinder wall of a piston housing in a combustion tool and, more particularly, to piston rings made of self lubricating materials.

BACKGROUND ART

It is well known that commercially available piston rings can be molded from a wearable low friction, e.g. self-lubricating, material in a shape to act as self-lubricating, sealing piston rings. Typically, such piston rings are made of PTFE (polytetraflouroethylene) which have extraordinarily low coefficients of sliding friction, high thermal stability and satisfactory wear properties. In fact, these PTFE rings are used in the vast majority of cordless, internal combustion engine-driven pneumatic nailers and air compressors. The presence of a PTFE ring in the piston assembly of an internal combustion engine would negate the need for an external lubricant, and allows the engine to run on lubricant-free fuel which is less costly than lubricant-added fuel. However, it has been observed that the use of PTFE rings to perform both self-lubricating and sealing functions has certain disadvantages.

More particularly, when the PTFE rings are used as a direct replacement for steel sealing rings, the natural lubricity of the PTFE rings is so excellent that it makes the cylinder wall too slippery. As a result, the piston will not retain its position at the top of the stroke (TDC). This causes problems in fuel-air mixture and in the pre-travel of the driver blade.

While it has been proposed to solve the above problem by forming additional grooves in the cylinder to physically hold the piston at TDC, arrangements of such grooves or the like have necessitated the reconstruction of the piston from several points at high costs. This, in turn, can adversely affect the marketability of the tool.

SUMMARY OF THE INVENTION

It is, therefore, an object of the present invention to provide a piston ring assembly for use in internal combustion engine-driven tools in which the aforementioned disadvantages are avoided.

It is another object of the present invention to provide a piston ring assembly for use in an internal combustion engine of a cordless tool which is capable of efficiently lubricating the cylinder wall of a piston housing while allowing enough friction for the piston to operate properly within the piston housing during cycling, especially when the piston is at the top-of-the-stroke position.

It is a further object of the present invention to provide a non-sealing, self-lubricating ring for use in the inventive piston ring assembly. The non-sealing, self-lubricating ring is configured to optimize the lubricity of the piston housing by uniformly transferring the self-lubricating material onto the cylinder wall.

These and other objects of the present invention are achieved by separating the sealing and lubricating functions of the piston ring assembly in an internal combustion engine.

In accordance with an aspect of the present invention, a piston assembly comprises a reciprocating piston axially movable within a cylinder, and a piston ring assembly. The piston ring assembly includes at least one sealing ring, for sealing between an inner wall of the cylinder and the piston, and a non-sealing, self-lubricating ring positioned between the inner wall of the cylinder and the piston and axially spaced from the sealing ring. The non-sealing, self-lubricating ring is made at least partially of a low-friction wearable material.

In a preferred embodiment, the non-sealing, self-lubricating ring is made of PTFE while the sealing ring is a steel sealing ring. Thus, the non-sealing, PTFE ring is used in conjunction with the steel ring wherein the PTFE ring will be used solely to lubricate the cylinder wall and the steel ring will perform the sealing function of the piston to the cylinder wall. By not utilizing the PTFE ring as a seal, many different shapes and geometries of the PTFE ring are possible to achieve-maximum lubrication results.

The foregoing objects of the present invention are also achieved by a non-sealing, self-lubricating ring configured to be in contact with the cylinder wall and rotate about the piston during engine operation, thereby evenly transferring the self-lubricating material onto the cylinder wall.

In accordance with an aspect of the present invention, the non-sealing, self-lubricating ring has an outer circumferential portion which forms a plurality of obliquely extending gas passages communicating upper and lower surfaces of the non-sealing, self-lubricating ring. As a result, gases or fluids contained in the cylinder are free to move through the outer circumferential portion to promote rotation of the non-sealing, self-lubricating ring about the piston during axial movements thereof within the cylinder.

In accordance with another aspect of the present invention, the non-sealing, self-lubricating ring comprises an annular cylindrical body adapted to be mounted on and carried by a piston axially movable within a cylinder, and a plurality of fins of a low-friction wearable material formed on the outer circumferential surface of the annular body and adapted to be in constant contact with an inner wall of the cylinder. The radial fins extend obliquely between the end faces of the annular body to promote rotation of the non-sealing, self-lubricating ring about the piston during axial movements of the piston within the cylinder. As a result, the low-friction wearable material, which is preferably PTFE, will transfer itself easily and uniformly to the inner wall of the cylinder.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout, and wherein:

FIG. 1 is a schematic sectional view showing a piston assembly of an internal combustion engine utilizing a non-sealing, self-lubricating ring of the present invention;

FIG. 2 is a plan view of a non-sealing, self-lubricating ring in accordance with an embodiment of the present invention;

FIG. 3 is a side view of the non-sealing, self-lubricating ring of FIG. 2;

FIG. 4 is an enlarged fragmentary view of a split opening of the non-sealing, self-lubricating ring shown in FIG. 2;

BEST MODE FOR CARRYING OUT THE INVENTION

Figure 5:
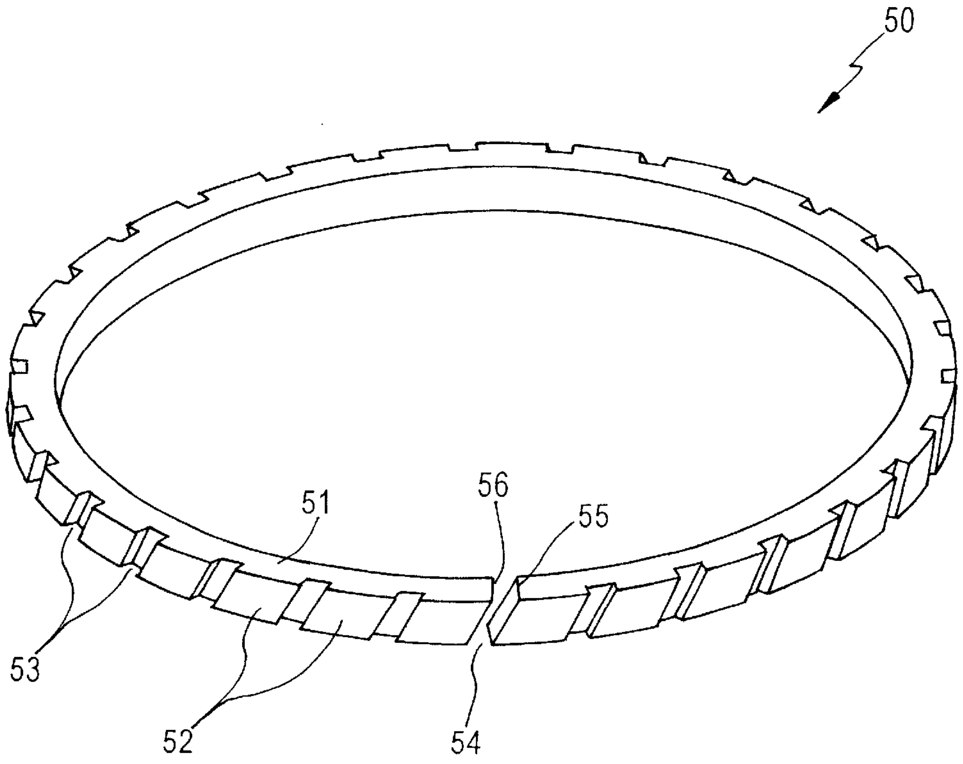
FIG. 5 is a perspective view of a non-sealing, self-lubricating ring in accordance with another embodiment of the present invention.

A non-sealing, self-lubricating ring, a piston assembly utilizing the non-sealing, self-lubricating ring, and an internal combustion engine utilizing the piston assembly according to the present invention are described. In the following detailed description, for purposes of explanation, numerous specific details are set forth in order to provide a thorough understanding of the present invention. It will be apparent, however, that the present invention may be practiced without these specific details. In other instances, well-known structures and devices are schematically shown in order to simplify the drawing.

Referring now to FIG. 1, an internal combustion engine 10 is shown. The internal combustion engine 10 comprises a cylinder and a reciprocating piston 12. The cylinder includes a cylinder wall 11 and a cylinder head (not shown). The cylinder head, cylinder wall 11 and piston 12 together define a combustion chamber 19 into which fuel is infected for ignition or self-ignition. Piston 12 may be connected by a piston rod (not shown) to a crankshaft (not shown) to transmit power to the outside. It should be understood that the invention is equally suitable for use in any type of internal combustion engine where it is desirable to prevent combustion gases from leaking into other parts of the engine and/or to prevent contaminants from entering combustion chamber 19.

Piston rings 13, 14 are provided to seal between piston 12 and cylinder wall 11 during engine operation. Piston rings 13, 14 seal in the combustion gases and the compression pressures generated at the end of the ignition stroke. Furthermore, the interface between cylinder wall 11 and piston rings 13, 14 prevents the leakage of contaminants, such as crankcase oil, into combustion chamber 19 during engine operation.

As mentioned in the above discussion, if piston rings 13, 14 possess high lubricity, cylinder wall 11 may be made so slippery that piston 12 may not retain its position at the top of the stroke (TDC). This in turn causes problems in fuel-air mixture and in the pre-travel of the driver blade. Therefore, it is important to configure piston rings 13, 14 to supply the necessary friction to keep piston 12 at the top of its stroke. Without this friction, piston 12 will slide down and not be ready for the next combustion cycle.

It should be understood that piston rings 13, 14 of the present invention serve two functions i) to act as the main seal during combustion, and ii) to supply the necessary friction between cylinder wall 11 and piston 12. Any arrangement of piston rings 13, 14 which meets the above two requirements will be suitable for the purpose of the present invention. Preferably, piston rings 13, 14 are made of steel though other materials are not excluded. Likewise, the present invention is not limited to the double-ring configuration shown in FIG. 1, i.e. any other number of piston rings may be used.

In addition to piston rings 13, 14, the piston assembly of the present invention is further provided with a ring 15 for lubricating cylinder wall 11. As can be seen in FIG. 1, non-sealing, self-lubricating ring 15 of the invention is placed below piston rings 13, 14 with respect to combustion chamber 19. However, other arrangements are not excluded. For example, non-sealing, self-lubricating ring 15 can be positioned closer to combustion chamber 19, e.g. above at least one of piston rings 13, 14.

Since a gap 18 inherent between cylinder wall 11 and piston 12 has been completely sealed by piston rings 13, 14, there is no need to configure ring 15 to form a seal. In accordance with the present invention, ring 15 is a non-sealing, self-lubricating ring. Apparently, non-sealing, self-lubricating ring 15 is not necessarily subject to strict requirements of a seal, and its configuration could be more flexible than those of self-lubricating sealing rings known in the art which function as both a seal and a self-lubricating element. The configuration, i.e. material and shape, of non-sealing, self-lubricating ring 15 can be selected to exclusively optimize the lubricity of cylinder wall 11.

According to one aspect of the present invention, non-sealing, self-lubricating ring 15, or at least its outer portion which contacts with cylinder wall 11, is made of a wearable low-friction material. The wearable (self-lubricating) low-friction material should be capable of transferring itself to cylinder wall 11 during axial movements of piston 12 within the cylinder, thereby allowing non-sealing, self-lubricating ring 15 to move easily along and efficiently lubricate cylinder wall 11. Preferably, non-sealing, self-lubricating ring 15 is made of a synthetic-resin material with low friction coefficient and self-lubricating properties, such as polytetrafluoroethylene (PTFE).

According to another aspect of the present invention, non-sealing, self-lubricating ring 15 is configured to ensure uniform distribution of the wearable low-friction material on, and hence uniform lubrication of, the entire cylinder wall 11. This can best be done if non-sealing, self-lubricating ring 15 is, for instance, caused to rotate during axial movements of piston 12 within the cylinder. For this purpose, non-sealing, self-lubricating ring 15 is provided with surfaces which are slanted with respect to the axial direction of the cylinder. When piston 12 moves up and down within the cylinder, pressure of gases or other fluids contained in the cylinder will act upon the slanted surfaces causing non-sealing, self-lubricating ring 15 to rotate. FIGS. 2–4, 5 and 6 illustrate exemplary embodiments of a non-sealing, self-lubricating ring having such slanted surfaces in accordance with the present invention.

As can be seen in FIG. 2, a non-sealing, self-lubricating ring 20 includes an annular body 21, and a plurality of radial fins 22 formed on the outer surface of annular body 21. As can be seen in FIG. 3, fins 22 obliquely extend between upper and lower end faces 31, 32 of annular body 21. More particularly, fins 22 extend from upper end face 31 of annular body 21 to the lower end face 32 thereof. Each adjacent pair of fins 22 forms in between a channel 23 which also obliquely extends between upper and lower end faces 31, 32 of annular body 21. Upper and under sides 33, 34 of each of fins 22 are slanted with respect to the axial direction of the cylinder, and will be acted upon by gases or fluids contained in the cylinder during engine operation (movements of piston 12). Non-sealing self-lubricating ring 20 is thus caused to rotate.

A similar non-sealing, self-lubricating ring 50 is illustrated in FIG. 5. Non-sealing self-lubricating ring 50 comprises an annular body 51 and radial fins 52 formed on the outer surface of annular body 51. Ring 50 differs from ring 20 in that ring 50 has channels 53 smaller than fins 52 while in ring 20, channels 23 are larger than fins 22. Furthermore, fins 52 of ring 50 are slanted at a steeper angle than that of fins 22 in ring 20. However, both rings 20 and 50 are formed with a plurality of gas/fluid passages (in the form of channels 23, 53) which communicate upper and lower end faces of the rings. Therefore, during engine operation, i.e. up-and-down movements of piston 12, gases or fluids contained in the cylinder are free to move from one of the upper and lower end faces to the other via the slanted passages, thereby facilitating rotation of the non-sealing, self-lubricating ring 20 or 50. It is worthwhile noting that presence of channels 23, 53 excludes the use of rings 20, 50 as a sealing element between cylinder wall 11 and piston 12.

It should be understood that though channels 23, 53 have been shown and described to be formed at the interface of cylinder wall 11 and non-sealing, self-lubricating ring 20, 50, other arrangements can be contemplated. For example, the gas/fluid passages can be formed inside the non-sealing, self-lubricating ring itself (not shown). It should also be understood that the non-sealing, self-lubricating ring of the present invention does not necessarily have the "open" configurations with gas/fluid passages as depicted in FIGS. 2–3 and 5. A "closed" configuration may be available as illustrated in FIG. 6.

Figure 6:
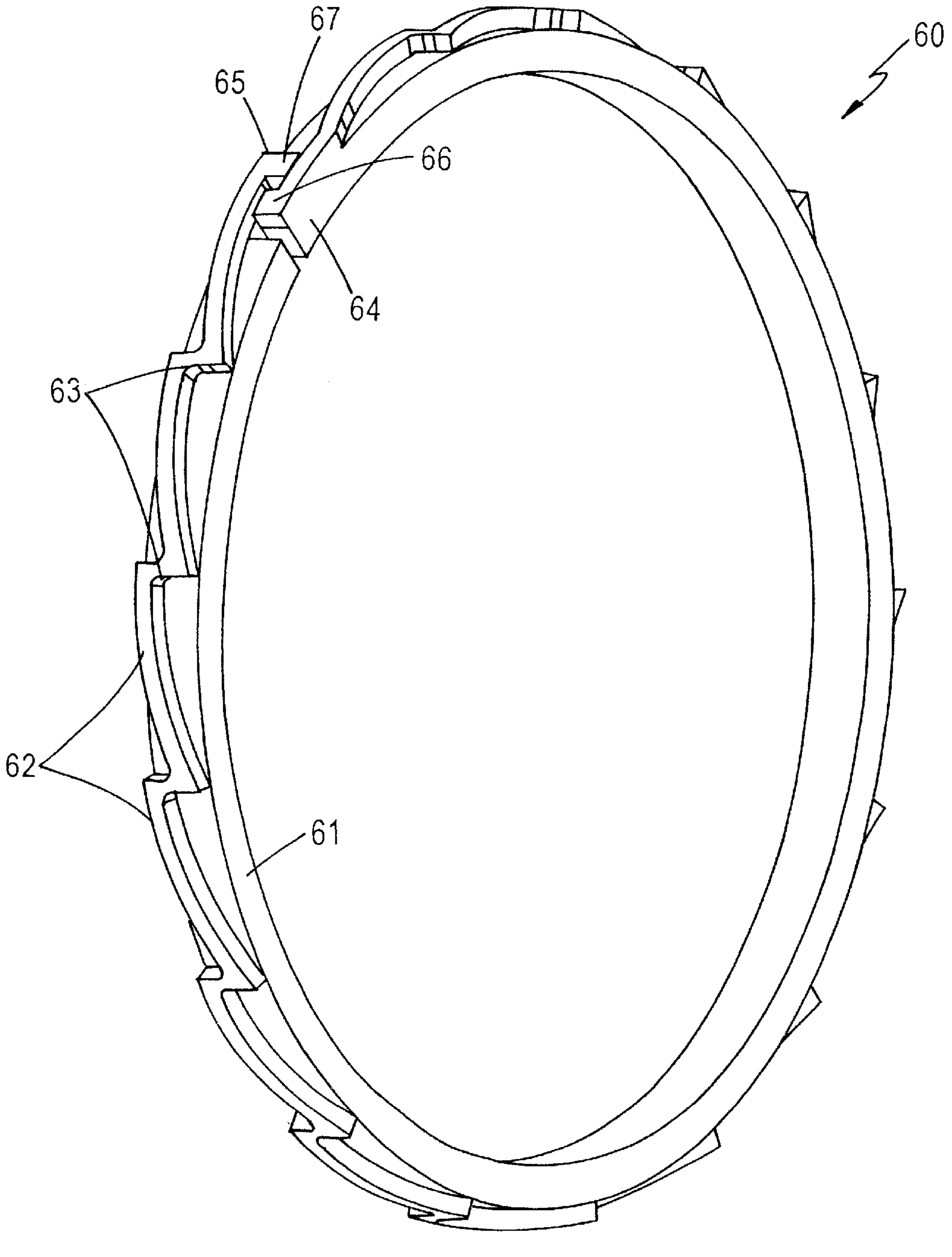
FIG. 6 is a perspective view of a non-sealing, self-lubricating ring in accordance with yet another embodiment of the present invention.

As can be seen in FIG. 6, non-sealing, self-lubricating ring 60 has an inner annular body 61 and a plurality of slanted primary fins 62. Ring 60 further includes a plurality of secondary fins 63 extending between the end faces of annular body 61 and connecting adjacent primary fins 62 with each other. When ring 60 is mounted on piston 12, secondary fins 63 extend substantially in the axial direction of the cylinder and therefore will not impede rotation of ring 60. As in the case of rings 20, 50, the slanted upper and under sides of primary fins 62 will be acted upon by gasses and fluids contained in the cylinder thereby causing ring 60 to rotate.

Besides specific shape and geometry of the non-sealing, self-lubricating ring, the manner in which the ring is installed may also contribute to promotion of the ring rotation. As can be seen in FIG. 1, non-sealing, self-lubricating ring 15 loosely fits in an annular groove 16 formed in a wall of piston 12. An inner portion of ring 15, such as annular body 21 or 51 of rings 20, 50, is at least partially received within groove 16. The non-sealing, loose fit between cylinder wall 11 and ring 15 allows ring 15 to rotate and distribute its lubricity evenly on cylinder wall 11.

Furthermore, ring 15 needs to be in constant contact with cylinder wall 11. For this purpose, an O-ring 70 or other type ring is preferably placed behind, or partially embedded in, non-sealing, self-lubricating ring 15 to maintain a certain contact force to cylinder wall 11, so that the transfer of the wearable low-friction material is maintained. It should be noted that in accordance with the present invention, the contact force exercised by O-ring 70 and non-sealing, self-lubricating ring 15 on cylinder wall 11 is not necessarily as large as a sealing force required to seal between e.g. piston rings 13, 14 and cylinder wall 11. Instead, the contact force should be sufficiently small to not impede rotation of ring 15. Alternatively, ring 15 can be molded directly over a spring steel ring or a wire spring ring (not shown) by, e.g., an insert molding process. In this manner, ring 15 can have more controlled and longer lasting spring properties.

In an embodiment, it is preferable to position the gas/fluid passages of the non-sealing, self-lubricating ring, such as channels 23, 53 of rings 20, 50, completely in gap 18 between cylinder wall 11 and piston 12, as shown in FIG. 1. Then, the gas/fluid passages will not be limited, at least partially, by the piston wall immediately above and below groove 16.

In another embodiment, it is preferable to form the non-sealing, self-lubricating ring of the present invention as a split annulus for easy fit on piston 12. As can be seen in FIG. 2, ring 20 may be discontinuous and have a split 23 which is shown in larger detail in FIG. 4. As can be seen in FIG. 4, ring 20 has first and second circumferential end portions 41, 42 overlapping each other. A similar arrangement can also be seen in FIG. 6 where ring 60 has first and second circumferential end portions 64, 65 overlapping each other. The difference between ring 20 and 60 resides in that circumferential end portions 64, 65 of ring 60 further include projections 66, 67, respectively, extending toward one another. Thus, a step lock is formed to keep ring 60 in place after ring 60 has been installed on piston 12.

Another split annulus arrangement for the non-sealing, self-lubricating ring of the present invention is depicted in FIG. 5 at 54. As can bee seen in FIG. 5, ring 50 extends circumferentially for less than 360 degree, and has a first end 55 stopping short of a second end 56. Spacing 54 between first and second ends 55, 56 is approximately of the same size as channels 53 formed between fins 52.

It should now be apparent that a non-sealing, self-lubricating ring, a piston assembly utilizing the non-sealing, self-lubricating ring, and an internal combustion engine utilizing the piston assembly according to the present invention have been described. In accordance with the present invention, the sealing and lubricating functions of a piston ring assembly are separately performed by one or more sealing rings and a non-sealing, self-lubricating ring, respectively.

On one hand, the sealing rings are not required to be made of a material with high self-lubricating properties, and can be configured to provide sufficient friction with the cylinder wall to retain the piston at the top of the stroke.

On the other hand, the non-sealing, self-lubricating ring is not required to function as a seal between the piston and the cylinder. Therefore, the non-sealing, self-lubricating ring may have many different shapes and geometries to achieve optimal lubrication of the cylinder wall. The non-sealing, self-lubricating ring may be even configured to rotate about the piston during engine operation to uniformly transfer the self-lubricating material on the cylinder wall. The service life of the non-sealing, self-lubricating ring is thus prolonged. These advantages would not be observed where a self-lubricating ring is configured to also form a complete seal between the piston and the cylinder because such a self-lubricating sealing ring would not be able to rotate and evenly distribute its lubricity to the cylinder wall. The service life of the self-lubricating sealing ring is also shortened.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A piston assembly, comprising:

a reciprocating piston axially movable within a cylinder;

at least one sealing ring for sealing between an inner wall of the cylinder and the piston; and means for lubricating the inner wall of the cylinder, said means consisting essentially of a non-sealing ring positioned between the inner wall of the cylinder and the piston and axially spaced from said at least one sealing ring, said non-sealing ring being made at least partially of a low-friction wearable material transferable onto the inner wall of the cylinder during relative movement of said non-sealing ring and said inner wall of the cylinder wherein the non-sealing ring comprises first and second end faces spaced from each other by a thickness of said non-sealing ring in an axial direction of said piston assembly, the non-sealing ring further comprising an inner portion at least partially received in a groove formed on the piston; and an outer portion being made of said low-friction wearable material and extending radially from the inner portion, wherein said outer portion has a plurality of obliquely extending gas passages that connect the first and second end faces and extend through the entire thickness of said ring, thereby allowing gases contained in the cylinder to move through said outer portion to promote rotation of said non-sealing ring about the piston during axial movements of the piston within the cylinder.

2. The piston assembly of claim 1, wherein said outer portion comprises a plurality of obliquely extending fins defining said gas passages, said fins extending from the first end face to the second end face.

3. The piston assembly of claim 2, wherein said non-sealing ring is formed as a split annulus extending circumferentially for less than 360 degrees and having first and second ends circumferentially spaced from each other by a circumferential spacing which is about the same size as a width of a channel defined between adjacent ones of said fins.

* * * * *